United States Patent
Fehenberger

(10) Patent No.: US 12,323,185 B2
(45) Date of Patent: Jun. 3, 2025

(54) METHOD FOR DETERMINING ACTUAL VALUES OF ONE OR MORE CHARACTERISTICS OF A PHASE-MODULATED OPTICAL SIGNAL

(71) Applicant: ADVA Optical Networking SE, Meiningen (DE)

(72) Inventor: Tobias Fehenberger, Munich (DE)

(73) Assignee: ADVA Optical Networking SE, Meiningen (DE)

( * ) Notice: Subject to any disclaimer, the term of this patent is extended or adjusted under 35 U.S.C. 154(b) by 36 days.

(21) Appl. No.: 17/742,005

(22) Filed: May 11, 2022

(65) Prior Publication Data
US 2022/0385370 A1  Dec. 1, 2022

(30) Foreign Application Priority Data
May 28, 2021  (EP) .................................. 21176721

(51) Int. Cl.
*H04B 10/079* (2013.01)
*H04B 10/27* (2013.01)
*H04B 10/548* (2013.01)
*H04J 14/02* (2006.01)

(52) U.S. Cl.
CPC ......... *H04B 10/27* (2013.01); *H04B 10/0793* (2013.01); *H04B 10/0795* (2013.01); *H04B 10/548* (2013.01); *H04J 14/02* (2013.01); *H04J 14/0227* (2013.01)

(58) Field of Classification Search
None
See application file for complete search history.

(56) References Cited

U.S. PATENT DOCUMENTS

| | | | |
|---|---|---|---|
| 5,715,277 A | 2/1998 | Goodson et al. | |
| 7,149,975 B1* | 12/2006 | Johnson | H04L 41/22 709/224 |
| 9,819,412 B1* | 11/2017 | Shankar | H04B 10/50575 |
| 2003/0016414 A1* | 1/2003 | Solheim | H04J 14/0257 398/82 |
| 2004/0017965 A1* | 1/2004 | Abe | H04B 10/035 385/24 |
| 2007/0264028 A1* | 11/2007 | Yuki | H04B 10/50577 398/183 |
| 2009/0226161 A1* | 9/2009 | Duan | H04B 10/032 398/2 |
| 2012/0170931 A1* | 7/2012 | Evans | H04B 10/40 398/48 |
| 2013/0170828 A1* | 7/2013 | McClean | H04B 10/0795 398/25 |

(Continued)

OTHER PUBLICATIONS

Wang et al: "Optical Performance Monitoring of Multiple Parameters in Future Optical Networks", Journal of Lightwave Technology, vol. 39, No. 12, Jun. 15, 2021, pp. 3792-3800 (Year: 2020).*

(Continued)

*Primary Examiner* — Li Liu
(74) *Attorney, Agent, or Firm* — The Webb Law Firm

(57) ABSTRACT

Provided is a method for determining actual values of one or more characteristics of a phase-modulated optical signal. The method includes the steps of acquiring the phase-modulated optical signal by a non-linear device; generating an electrical spectrum based on the acquired phase-modulated optical signal; and extracting actual values of one or more characteristics of the phase-modulated optical signal from the electrical spectrum.

8 Claims, 4 Drawing Sheets

(56) References Cited

U.S. PATENT DOCUMENTS

| | | | | |
|---|---|---|---|---|
| 2016/0380696 | A1* | 12/2016 | Deng | H04B 10/07953 |
| | | | | 398/25 |
| 2017/0019173 | A1* | 1/2017 | Li | H04B 10/61 |
| 2017/0070286 | A1* | 3/2017 | Nishihara | H04J 14/0298 |
| 2017/0244479 | A1* | 8/2017 | Jiang | H04B 10/077 |
| 2018/0175933 | A1* | 6/2018 | Nomura | H04B 10/50 |
| 2022/0131627 | A1* | 4/2022 | Beacall | H04B 17/3913 |
| 2022/0407595 | A1* | 12/2022 | Varughese | H04B 10/0731 |

OTHER PUBLICATIONS

Wang et al: "Machine Learning-Based Multifunctional Optical Spectrum Analysis Technique", IEEE Access, vol. 7, Jan. 20, 2019, pp. 19726-18737 (Year: 2019).*

Ionescu et al: "Cyclostationarity-based joint monitoring of symbol-rate, frequency offset, CD and OSNR for Nyquist WDM superchannels," Opt. Express, vol. 23, No. 20, pp. 25762-25772, 2015 (Year: 2015).*

Wang et al., "Intelligent constellation diagram analyzer using convolutional neural network-based deep learning", Optics Express, Jul. 2017, pp. 1-17, vol. 25: 15.

Wang et al., "Machine Learning-Based Multifunctional Optical Spectrum Analysis Technique", IEEE, 2019, pp. 19726-19737, vol. 7.

Wang et al., "Optical Performance Monitoring of Multiple Parameters in Future Optical Networks", Journal of Lightwave Technology, Jun. 2021, pp. 3792-3800, vol. 39:12.

Yi et al., "Tb/s Coherent Optical OFDM Systems Enabled by Optical Frequency Combs", Journal of Lightwave Technology, Jul. 2010, pp. 2054-2061, vol. 28:14.

* cited by examiner

METHOD FOR DETERMINING ACTUAL VALUES OF ONE OR MORE CHARACTERISTICS OF A PHASE-MODULATED OPTICAL SIGNAL

CROSS-REFERENCE TO RELATED APPLICATION

This application claims priority to European Patent Application No. 21176721.5 filed May 28, 2021, the disclosure of which is hereby incorporated by reference in its entirety.

BACKGROUND OF THE INVENTION

Field of the Invention

The present invention relates to a method for determining actual values of one or more characteristics of a phase-modulated optical signal, wherein the determined actual values of one or more characteristics of a phase-modulated optical signal can then be used to control the performance of optical channels in an optical network.

Description of Related Art

Spectrum sharing is a way to optimize the use of communication channels, by enabling multiple categories of users to safely share the same frequency bands. Spectrum sharing is necessary because a growing demand is crowding the communication channels. For example, smartphones, the Internet of Things, military and public safety radios, wearable devices, smart vehicles and countless other devices all depend in the same bands of the spectrum to share data, voice and images.

Therein, approaches have been provided that enable communication service providers to drive more revenue from their already deployed optical fiber networks by slicing the optical spectrum in their fiber infrastructure. Different frequency blocks can then be sold to different customers respectively third parties, enabling them to fully harness the untapped values in their networks.

However, within such an approach, it is necessary to ensure a strict user separation, to prevent degradation of the quality of transmission (QoT) of neighboring wavelength-division multiplexing (WDM) channels due to linear and non-linear interference. In particular, it is necessary to monitor characteristics of third-party transmitters respectively terminals, in order to be able to ensure that third-party terminal users do not use more resources than what they paid for, and to enable third-party terminals without performance impairments of other channels. It is known to use full coherent receivers or optical spectrum analyzers to monitor characteristics of third-party terminals, respectively to determine actual values of these characteristics, but these solutions are costly. For example, the cost of a coherent receiver is a major obstacle in the case of short-reach links, whose role in many areas of application is becoming increasingly important. Therefore, there is a need for an improved method for determining actual values of one or more characteristics of a phase-modulated optical signal.

U.S. Pat. No. 5,715,277 A discloses a method for a data communications device, such as a modem, to determine a symbol rate and carrier frequency combination, from a received probe signal for optimizing a bit rate for data transmission and reception. Therein, a processor is utilized to receive a probe signal, which typically contains noise and other distortions. Then, signal-to-distortion ratios are determined for a plurality of symbol rate and carrier frequency combinations, and other optimization parameters, such as channel characteristics and attenuation distortion parameters. These optimization parameters are then utilized to determine an optimal symbol rate and a carrier frequency.

According to one embodiment of the present invention, a method for determining actual values of one or more characteristics of a phase-modulated optical signal is provided, wherein the phase-modulated optical signal is acquired by a non-linear device, an electrical spectrum is generated based on the acquired, respectively received phase-modulated optical signal, and actual values of one or more characteristics of the phase-modulated optical signal are extracted from the electrical spectrum.

SUMMARY OF THE INVENTION

Generally, a data communication signal is any modulated electromagnetic wave or digital pulse over which data is transmitted from one location to another in a network. This signal is usually composed of two parts, a baseband signal and a carrier signal, which are mixed with each other during the process of modulation. Therein, phase-modulated optical signals are optical communication signals that are conditioned for transmission. In particular, phase modulation is a modulation pattern that encodes a message signal as variations in the instantaneous phase of a corresponding carrier wave.

Further, these optical communication signals have some basic and measurable characteristics associated with them, which are also known as their intrinsic features, and wherein these characteristics usually describe impairments that affect signal quality. For example, the intrinsic features of the signal might degrade the quality of transmission of neighboring wavelength-division multiplexing channels due to linear and non-linear interference.

Further, electrical spectrum refers to the full range of all frequencies of electromagnetic radiation and also to the characteristic distribution of electromagnetic radiation emitted, for example, by a third-party terminal. Therein, the signal characteristics, respectively impairments that affect signal quality also influence certain features of the electrical spectrum, wherefore these characteristics can also be derived, respectively extracted from the electrical spectrum.

Furthermore, a non-linear device here is a device that is configured to acquire respectively extract an optical signal, wherein an electrical signal is thereafter generated based on the acquired optical signal, so that the optical signal can be further processed and, in particular, so that non-linear further processing of the optical signal is enabled.

Thereby, information about the phase-modulated optical signal can easily be obtained and actual values of one or more characteristics of the phase-modulated optical signal can easily be determined, wherein, at the same time, as compared e.g. to a full coherent detection method, costs can significantly be saved. The method is also applicable to all past and current terminal configurations, and therefore, independently of the type and configuration of the terminal the third party uses. Thus, an improved method for determining actual values of one or more characteristics of a phase-modulated optical signal is provided.

Therein, the one or more characteristics of the phase-modulated optical signal can include a symbol rate, a roll-off factor and/or a modulation format.

In a digitally modulated signal, the symbol rate, which is also known as baud rate or modulation rate, defines the number of symbol changes, waveform changes, or signaling events across a transmission medium per unit of time.

Further, one of the main drawbacks of signal waveforms is that although they can very well control the power emissions within a bandwidth of interest, they send a relatively high amount of power outside the bandwidth of interest. Therein, the roll-off factor is a measure of the excess bandwidth of the filter.

High-capacity wavelength division multiplex systems further suffer from impairments arising from fiber non-linear effect, chromatic dispersion, polarization mode dispersion, and amplified spontaneous emission noise. These factors, however, limit the transmission capacity and distance in wavelength division multiplex systems. To improve the transmission performance of wavelength division multiplex systems, for example advanced modulation formats are used to trade off noise resilience or fiber propagation characteristics. Therein, one can for example distinguish between quadrature phase shift keying (QPSK), which is a modulation technique that transmits two bits per symbol, and quadrature amplitude modulation (QAM), with which higher data rates can be achieved, but at the costs of the noise margin.

Therefore, the characteristics can include parameters that can be used to determine whether third party terminal users use more resources than what they paid for, and whether there are performance impairments of other channels.

That the one or more characteristics of the phase-modulated optical signal include a symbol rate, a roll-off factor and/or a modulation format should, however, merely be understood as an example, respectively a preferred embodiment. However, the characteristics of the phase-modulated optical signal can include other parameters, for example a signaling type, too.

In one embodiment, the step of generating the electrical spectrum further comprises analog spectral slicing of the acquired phase-modulated optical signal to detect sub-bands of the acquired phase-modulated optical signal, digitally stitching the detected sub-bands to generate an optimized signal, and generating the electrical spectrum based on the optimized signal. Usually, a sampling rate, respectively an analog-to-digital converter (ADC) sampling rate of twice the one-sided baseband bandwidth is required, in order to avoid aliasing, respectively that different signals become indistinguishable when sampled, which is, however, not feasible for high-baud-rate transceivers. A sampling rate of twice the one-sided baseband bandwidth corresponds to a sampling rate of at least the symbol rate, respectively more if the roll-off factor is larger than zero. Therein, by correspondingly spectral slicing and stitching, the required ADC-specifications can be significantly reduced, wherein the optimized signal is generated in such a way that the signal is optimized with respect to the ADC-specifications.

In one embodiment, further a machine learning technique is used to extract the roll-off factor of the phase-modulated optical signal and/or the modulation format of the phase-modulated optical signal from the electrical spectrum. Thereby, the roll-off factor and/or the modulation format can easily be determined based on historical data, wherein accuracy and efficiency of the determination of the roll-off factor and/or the modulation format can continuously be improved. Therein, a corresponding machine learning model, for example an image classifier, can be trained based on image data generally showing the relationship between the roll-off factor and the power spectral density and image data generally showing the relationship between the modulation format and the power spectral density and/or labeled image data representing the power spectral density obtained during prior applications, respectively prior determinations of the roll-off factor and/or the modulation format or based on data correspondingly representing the power spectral density in the form of a vector or a matrix with complex numbers.

According to a further embodiment of the present invention, a method for controlling performance of an optical channel in an optical network is provided, wherein in the optical network pairs of nodes of the network are associated with distinct bands of optical channels used for communication between the pairs of nodes, and wherein actual values of one or more characteristics of a phase-modulated optical signal inputted into an optical channel in the optical network are determined using a method for determining actual values of one or more characteristics of a phase-modulated optical signal as described above, wherein, for each of the one or more characteristics, it is determined whether the actual value is within a predetermined range for the characteristic, and wherein an action is taken if, for one or more of the one or more characteristics, the actual value is outside of the predetermined range for the characteristic, to control performance of the optical channel.

Thereby, a method for controlling performance of an optical channel in an optical network is provided that is based on a method for determining actual values of one or more characteristics of the optical channel with which also actual values of one or more characteristics of the phase-modulated optical signal inputted into the optical channel by a third-party terminal can easily be determined, wherein, at the same time, as compared for example to a full coherent detection method, costs can significantly be saved. The determined values can then be used to ensure a strict user separation, respectively to ensure that third party terminal users do not use more resources than what they paid for and to prevent degradation of the quality of transmission of neighboring wavelength-division multiplexing channels due to linear and non-linear interference. The method is also applicable to all past and current terminal configurations, and therefore, independently of the type and configuration of the terminal the third party uses. Thus, an improved gatekeeper functionality is provided.

Therein, for each of the one or more characteristics, a warning can be issued if the actual value is slightly outside of the predetermined range for the characteristic, and an allocation of wavelength to channel can be blocked if the actual value is greatly outside of the predetermined range for the characteristic.

The predetermined range for the characteristic can be set by a communication service provider based on what has been agreed with the third party. That the actual value is slightly outside of the predetermined range further means that the actual value deviates from an outer limit of the predetermined range only by a specific value or less, wherein the specific value can again be set by the communication service provider, and wherein the specific value can for example be 102.5% of the outer limit of the predetermined range. Similarly, that the actual value is greatly outside of the predetermined range means that the actual value deviates from the outer limit of the predetermined range by more than the specific value.

Further, that a warning is issued means that a third-party user can for example be acoustically, visually or haptically warned that the actual value is slightly outside of the predetermined range.

Thereby, the third-party user or the third party are allowed to first take appropriate actions and, for example, correspondingly contact the communication service provider, before the allocation of wavelength to the channel is finally blocked.

The step of, for each of the one or more characteristics, taking an action if the actual value is outside of the predetermined range for the characteristic can also comprise dampening a channel bandwidth and/or attenuating a signal power. Thereby, it can be ensured that the third-party users do not use more resources than what they paid for, respectively that the quality of transmission is correspondingly decreased after a third-party user has used the number of resources he paid for.

According to another embodiment of the invention, an apparatus for determining actual values of one or more characteristics of a phase-modulated optical signal is provided, wherein the apparatus comprises a non-linear device that is configured to acquire the phase-modulated optical signal, a generating device that is configured to generate an electrical spectrum based on the acquired phase-modulated optical signal, and a pre-processing device that is configured to extract actual values of one or more characteristics of the phase-modulated optical signal from the electrical spectrum.

Thereby, an apparatus is provided that is configured to easily determine actual values of one or more characteristics of the phase-modulated optical signal, wherein, at the same time, as compared e.g. to a full coherent detector, costs can significantly be saved. The apparatus is also applicable to all past and current terminal configurations, and therefore, independently of the type and configuration of the terminal the third party uses. Thus, an improved apparatus for determining actual values of one or more characteristics of a phase-modulated optical signal is provided.

The one or more characteristics of the phase-modulated optical signal can again include a symbol rate, a roll-off factor and/or a modulation format. Therefore, the characteristics can include parameters that can be used to determine whether third-party terminal users use more resources than what they paid for, and whether there are performance impairments of other channels.

That the one or more characteristics of the phase-modulated optical signal include a symbol rate, a roll-off factor and/or a modulation format should, however, merely be understood as an example, respectively a preferred embodiment. However, the characteristics of the phase-modulated optical signal can include other parameters, for example a signaling type, too.

Further, the non-linear device can be a photodiode. Compared to other non-linear devices, photodiodes have the advantage that they are relatively cheap and easy to use, as only a single photodiode as passive optical component is required, but no active optical components at all.

In an optical network, wherein in the optical network pairs of nodes of the network are associated with distinct bands of optical channels used for communication between the pairs of nodes, for each channel a separate non-linear device can be used to acquire the phase-modulated optical signal inputted into the respective optical channel, wherein the corresponding non-linear device can be placed at the aggregation node, respectively before optical channels are multiplexed together onto a single fiber. However, there might also be only one non-linear device for all channels, wherein the non-linear device is configured to acquire the phase-modulated optical signals after the optical channels are multiplexed together, and wherein the corresponding apparatus further comprises a tunable optical filter to determine the phase-modulated optical signal inputted into one of the channels.

In one embodiment, the apparatus further comprises at least one tunable mixer that is configured to perform slicing and stitching of the acquired phase-modulated optical signal to generate an optimized signal, wherein the generating device is configured to generate the electrical spectrum based on the optimized signal. Usually, a sampling rate, respectively an analog-to-digital converter (ADC) sampling rate of twice the one-sided baseband bandwidth is required, in order to avoid aliasing, respectively that different signals become indistinguishable when sampled, which is, however, not feasible for high-baud-rate transceivers. Therein, by correspondingly spectral slicing and stitching, the required ADC-specifications can be significantly reduced, wherein the optimized signal is generated in such a way that the signal is optimized with respect to the ADC-specifications.

Further, the pre-processing device can be configured to use a machine learning technique to extract the roll-off factor of the phase-modulated optical signal and/or the modulation format of the phase-modulated optical signal from the electrical spectrum. Thereby, the roll-off factor and/or the modulation format can easily be determined based on historical data, wherein accuracy and efficiency of the determination of the roll-off factor and/or the modulation format can continuously be improved. Therein, a corresponding machine learning model can be trained based on labeled image data representing the power spectral density obtained during prior applications, respectively prior determinations of the roll-off factor and/or the modulation format or based on data correspondingly representing the power spectral density in the form of a vector or a matrix with complex numbers.

According to still another embodiment of the invention, an apparatus for controlling performance of an optical channel in an optical network is provided, wherein in the optical network pairs of nodes of the network are associated with distinct bands of optical channels used for communication between the pairs of nodes, wherein the apparatus comprises an apparatus for determining actual values of one or more characteristics of a phase-modulated optical signal as described above, which is configured to determine actual values of one or more characteristics of an optical channel in the optical network, a determining device that is configured to, for each of the one or more characteristics, determine whether the actual value is within a predetermined range for the characteristic, and an actuator that is configured to take an action if, for one or more of the one or more characteristics, the actual value is outside of the predetermined range for the characteristic, to control performance of the optical channel.

Thereby, a gatekeeper, respectively an apparatus for controlling performance of an optical channel in an optical network is provided that is based on an apparatus for determining actual values of one or more characteristics of the optical channel that is configured to easily determine actual values of one or more characteristics of the phase-modulated optical signal inputted into the optical channel by a third-party terminal, wherein, at the same time, as compared e.g. to a full coherent detector, costs can significantly be saved. The determined values can then be used to ensure a strict user separation, respectively to ensure that third-party terminal users do not use more resources than what they paid for and to prevent degradation of the quality of transmission of neighboring wavelength-division multiplexing channels due to linear and non-linear interference. The apparatus is also applicable to all past and current terminal configurations, and therefore, independently of the type and configuration of the terminal the third party uses. Thus, an improved gatekeeper functionality is provided.

BRIEF DESCRIPTION OF THE DRAWINGS

Embodiments of the invention will now be described with reference to the drawings.

DESCRIPTION OF THE INVENTION

Figure 1:
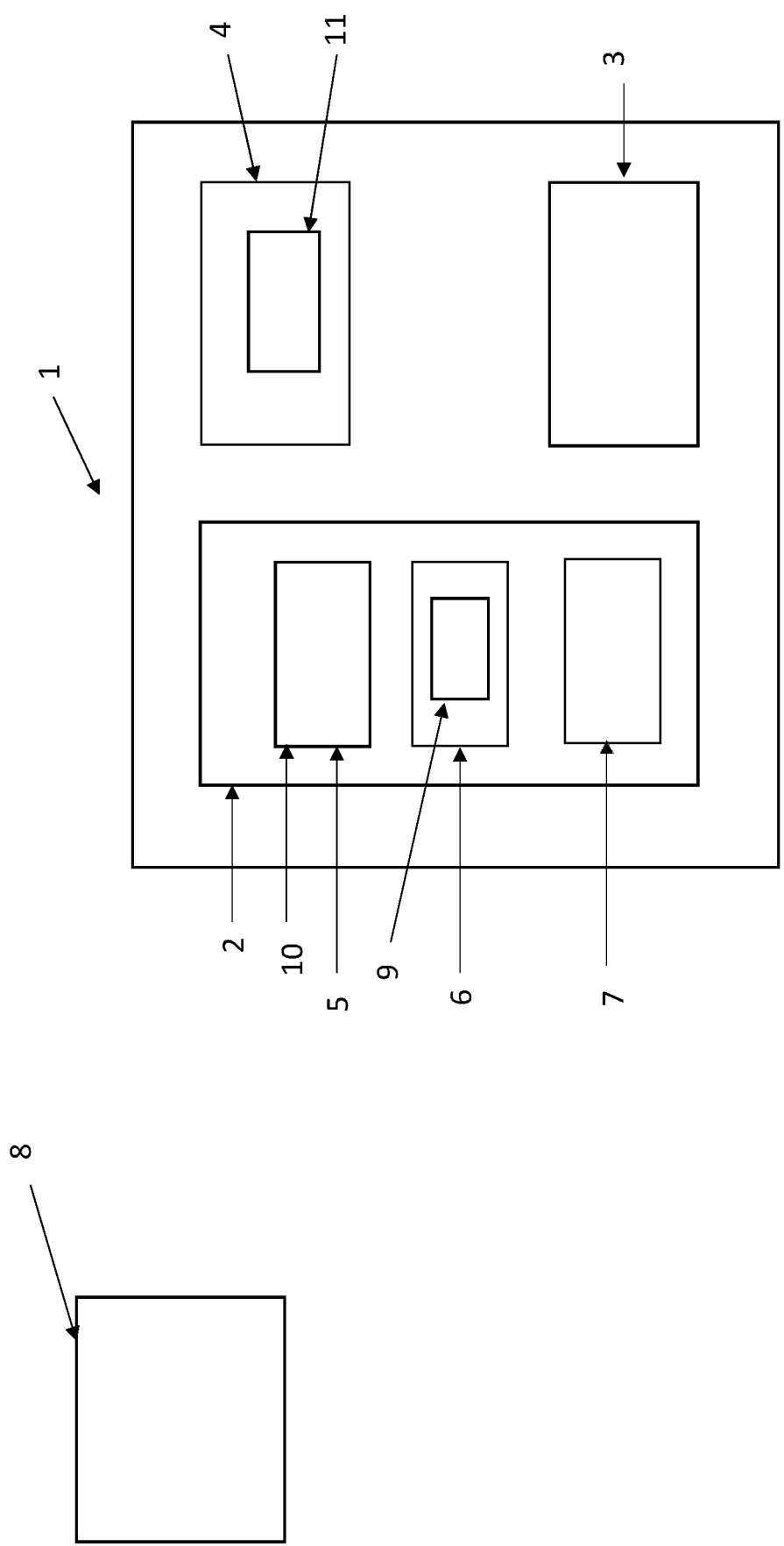
FIG. 1 illustrates an apparatus for controlling performance of an optical channel in an optical network according to a first embodiment of the invention.

FIG. 1 illustrates an apparatus 1 for controlling performance of an optical channel in an optical network according to a first embodiment of the invention.

As shown in FIG. 1, according to the first embodiment, an apparatus 1 for controlling performance of an optical channel in an optical network is provided, wherein in the optical network pairs of nodes of the network are associated with distinct bands of optical channels used for communication between the pairs of nodes, wherein the apparatus 1 comprises an apparatus 2 for determining actual values of one or more characteristics of a phase-modulated optical signal, which is configured to determine actual values of one or more characteristics of a phase-modulated optical signal inputted into an optical channel in the optical network, a determining device 3 that is configured to, for each of the one or more characteristics, determine whether the actual value is within a predetermined range for the characteristic, and an actuator 4 that is configured to take an action if, for one or more of the one or more characteristics, the actual value is outside of the predetermined range for the characteristic, to control performance of the optical channel.

Therein, the determining device 3 can be a comparator or any other processing device on which code executable to determine, for each of the one or more characteristics, whether the actual value is within a predetermined range for the characteristic, is stored.

As also shown in FIG. 1, the apparatus 2 for determining actual values of one or more characteristics of a phase-modulated optical signal further comprises a non-linear device 5 that is configured to acquire the phase-modulated optical signal inputted into the optical channel, a generating device 6 that is configured to generate an electrical spectrum based on the acquired phase-modulated optical signal, and a pre-processing device 7 that is configured to extract actual values of one or more characteristics of the phase-modulated optical signal from the electrical spectrum.

Thus, a gatekeeper, respectively an apparatus 1 for controlling performance of an optical channel in an optical network is provided that is based on an apparatus 2 for determining actual values of one or more characteristics of the optical channel that is configured to easily determine actual values of one or more characteristics of the phase-modulated optical signal inputted into the optical channel by a third party terminal, wherein the third party terminal is indicated with reference number 8 in FIG. 1, and wherein, at the same time, as compared e.g. to a full coherent detector, costs can significantly be saved. The determined values can then be used to ensure a strict user separation, respectively to ensure that third-party terminal users do not use more resources than what they paid for and to prevent degradation of the quality of transmission of neighboring wavelength-division multiplexing channels due to linear and non-linear interference. The apparatus 1 is also applicable to all past and current terminal configurations, and therefore, independently of the type and configuration of the terminal the third party uses. Thus, an improved gatekeeper functionality is provided.

According to the first embodiment, the generating device 6 further comprises an analog-to-digital converter 9 that can be followed by an FFT processor, wherein the FFT processor is not shown in FIG. 1. Therein, the generating device 6 according to the first embodiment is configured in such a way that the acquired signal is directly converted into a digital signal after the signal has been acquired by the non-linear device 5. However, the generating device can for example also be configured in such a way that first a power spectral density of the acquired signal is obtained in the analog domain with an electrical oscilloscope, wherein only this power spectral density is then converted from analog to digital.

Therein, the one or more characteristics of the phase-modulated optical signal include a symbol rate, a roll-off factor and a modulation format. Therefore, the characteristics include parameters that can be used to determine whether third-party terminal users use more resources than what they paid for, and whether there are performance impairments of other channels.

Further, according to the first embodiment, the non-linear device 5 is a single photodiode 10.

Furthermore, according to the first embodiment, for each channel a separate non-linear device 5 is used to acquire the phase-modulated optical signal inputted into the respective optical channel, wherein the corresponding non-linear device 5 is placed at the aggregation node, respectively before optical channels are multiplexed together onto a single fiber, and wherein the corresponding non-linear device 5 is configured to acquire the phase-modulated optical signal directly after the phase-modulated signal has been emitted by a transmitter respectively the third-party terminal 8. In particular, according to the first embodiment, a distance between the non-linear device 5 and the third-party terminal 8 is 15 km or less, wherein the exact value of the distance depends, among others, on the symbol rate of the third-party terminal 8, the roll-off factor, ASE noise, the modulation format, etc. However, that for each channel a separate non-linear device is used should merely be understood as an example, and there might also be only one non-linear device for all channels, wherein the non-linear device is configured to acquire the phase-modulated optical signal after the optical channels are multiplexed together, wherein the corresponding apparatus further comprises a tunable optical filter to determine the phase-modulated optical signal inputted into one of the channels.

As also shown in FIG. 1, the actuator according to the first embodiment further comprises a variable optical attenuator 11, to correspondingly vary the signal in the corresponding fiber based on the actual values of the characteristics, respectively to dampen a channel bandwidth and/or to attenuate the signal power.

Figure 2:
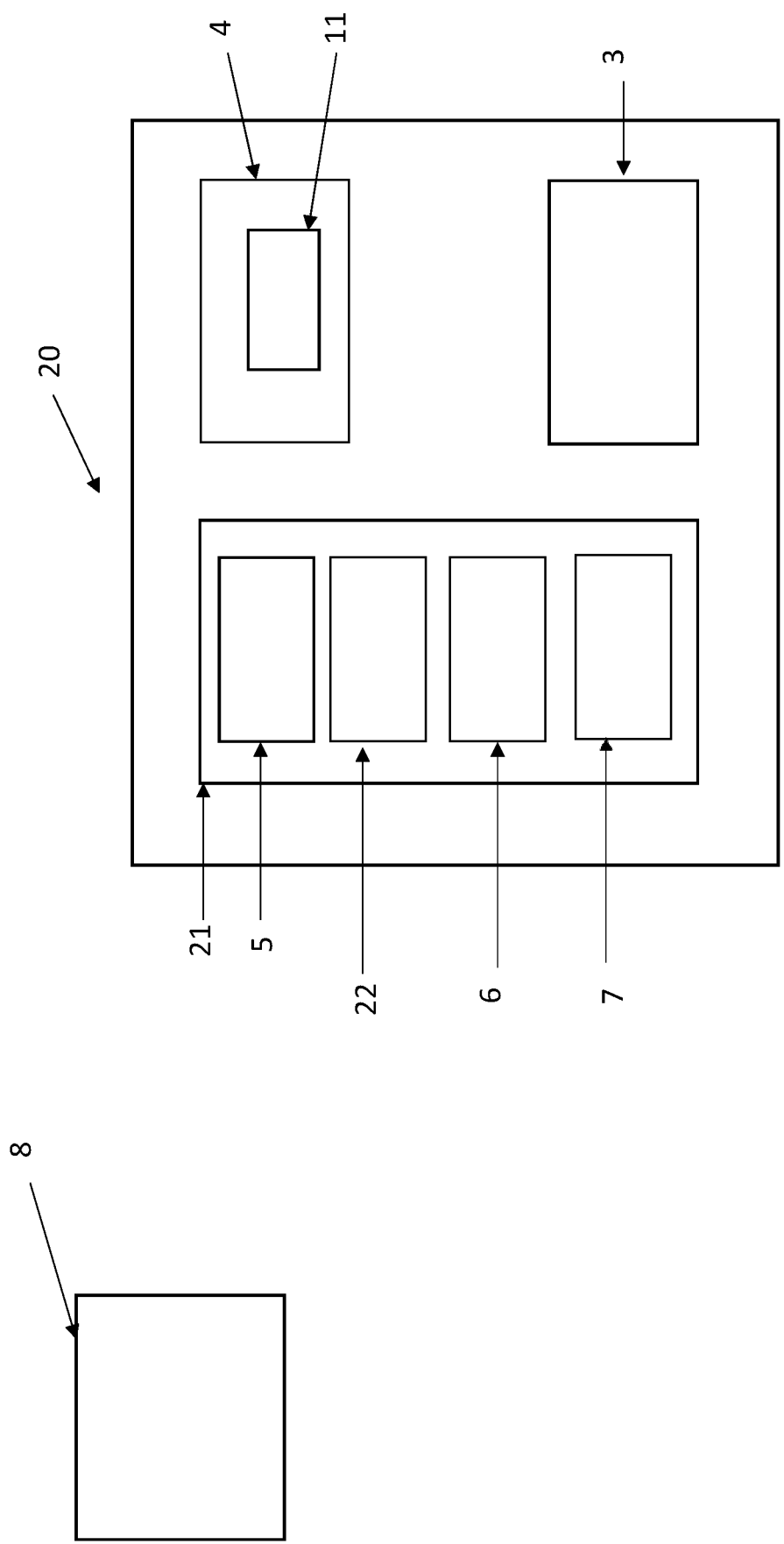
FIG. 2 illustrates an apparatus for controlling performance of an optical channel in an optical network according to a second embodiment of the invention.

FIG. 2 illustrates an apparatus 20 for controlling performance of an optical channel in an optical network according to a second embodiment of the invention. Therein, identical structural features as within the embodiment shown in FIG. 1 are identified by identical reference symbols.

As shown in FIG. 2, according to the second embodiment an apparatus 20 for controlling the performance of optical channels in an optical network is provided, wherein in the optical network pairs of nodes of the network are associated with distinct bands of optical channels used for communication between the pairs of nodes, wherein the apparatus 20 again comprises an apparatus 21 for determining actual values of one or more characteristics of a phase-modulated optical signal, which is configured to determine actual values of one or more characteristics of a phase-modulated optical signal inputted into an optical channel in the optical network, a determining device 3 that is configured to determine, for each of the one or more characteristics, whether the actual value is within a predetermined range for the characteristic, and an actuator 4 that is configured to take an action if, for one or more of the one or more characteristics, the actual value is outside of the predetermined range for the characteristic, to control performance of the optical channel.

As also shown in FIG. 2, the apparatus 21 for determining actual values of one or more characteristics of the phase-modulated optical signal again comprises a non-linear device 5 that is configured to acquire the phase-modulated optical signal, a generating device 6 that is configured to generate an electrical spectrum based on the acquired phase-modulated optical signal, and a pre-processing device 7 that is configured to extract actual values of one or more characteristics of the phase-modulated optical signal from the electrical spectrum.

Therein, the difference between the apparatus 1 for controlling performance of an optical channel in an optical network according to the first embodiment as shown in FIG. 1 and the apparatus 20 for controlling performance of an optical channel in an optical network according to the second embodiment as shown in FIG. 2 is that the apparatus 21 for determining actual values of one or more characteristics of the phase-modulated signal according to the second embodiment further comprises a tunable mixer 22 that is configured to perform slicing and stitching of the acquired phase-modulated optical signal to generate an optimized signal, wherein the generating device 6 is configured to generate the electrical spectrum based on the optimized signal.

In particular, the tunable mixer 22 is configured to perform analog spectral slicing to detect sub-bands in the acquired signal, to tune an analog wide-band mixer to a center frequency, to detect a sub-band with slow analog to digital conversion, to repeat this with twice the center frequency, three times the center frequency, etc., and to digitally stitch the sub-bands, in order to reduce the hardware requirements of the corresponding analog-to-digital converter.

Figure 3:
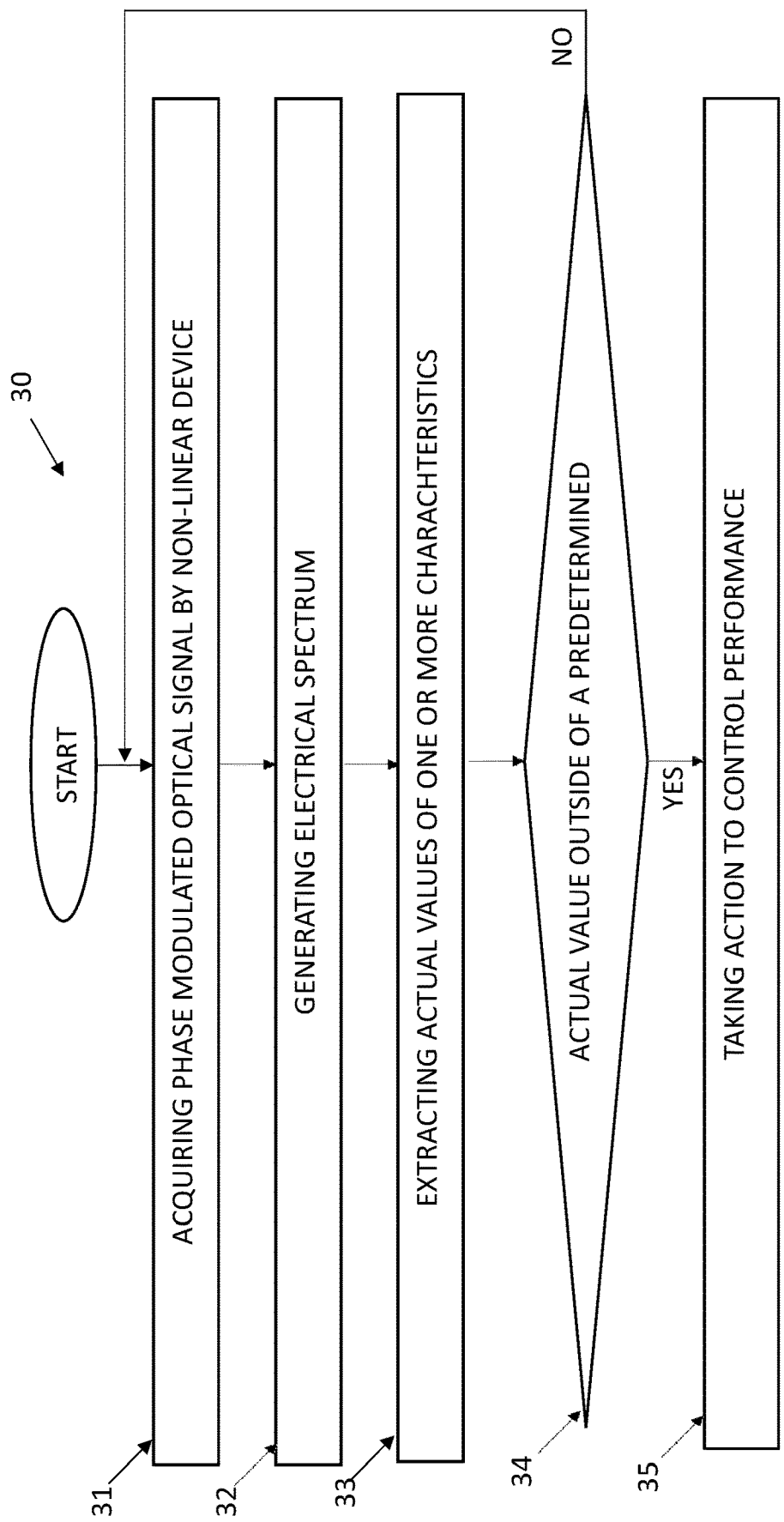
FIG. 3 illustrates a flowchart of a method for controlling performance of an optical channel in an optical network according to embodiments of the invention.

FIG. 3 illustrates a flowchart of a method 30 for controlling performance of an optical channel in an optical network according to embodiments of the invention.

In particular, FIG. 3 illustrates a flowchart of a method 30 for controlling performance of an optical channel in an optical network, wherein in the optical network pairs of nodes of the network are associated with distinct bands of optical channels used for communication between the pairs of nodes.

As shown in FIG. 3, the method 30 comprises a step 31 of acquiring a phase-modulated optical signal by a non-linear device, wherein the phase-modulated optical signal is inputted into an optical channel in the optical network, a step 32 of generating an electrical spectrum based on the acquired phase-modulated optical signal, and a step 33 of extracting actual values of one or more characteristics of the phase-modulated optical signal from the electrical spectrum.

Further, the shown method 30 further comprises a step 34 of determining, for each of the one or more characteristics, whether the actual value is within a predetermined range for the characteristic, and a step 35 of taking an action if, for one or more of the one or more characteristics, the actual value is outside of the predetermined range for the characteristic, to control performance of the optical channel.

Otherwise, as shown in FIG. 3, if it is determined in step 34 that the actual values are all within the corresponding predetermined ranges, the method 30 refers back to step 31 and steps 31, 32, 33 and 34 are repeated.

Therein, according to the embodiments of FIG. 3, for each of the one or more characteristics, a warning is issued if the actual value is slightly outside of the predetermined range for the characteristic, and an allocation of wavelength to channel is blocked if the actual value is greatly outside of the predetermined range for the characteristic.

The predetermined range for the characteristic can be set by a communication service provider based on what has been agreed with the third party. That the actual value is slightly outside of the predetermined range further means that the actual value deviates from an outer limit of the predetermined range only by a specific value or less, wherein the specific value can again be set by the communication service provider, and wherein the specific value can for example be 102.5% of the outer limit of the predetermined range. Similarly, that the actual value is greatly outside of the predetermined range means that the actual value deviates from the outer limit of the predetermined range by more than the specific value.

Further, that a warning is issued means that a third-party user can for example be acoustically, visually or haptically warned that the actual value is slightly outside of the predetermined range.

Figure 4:
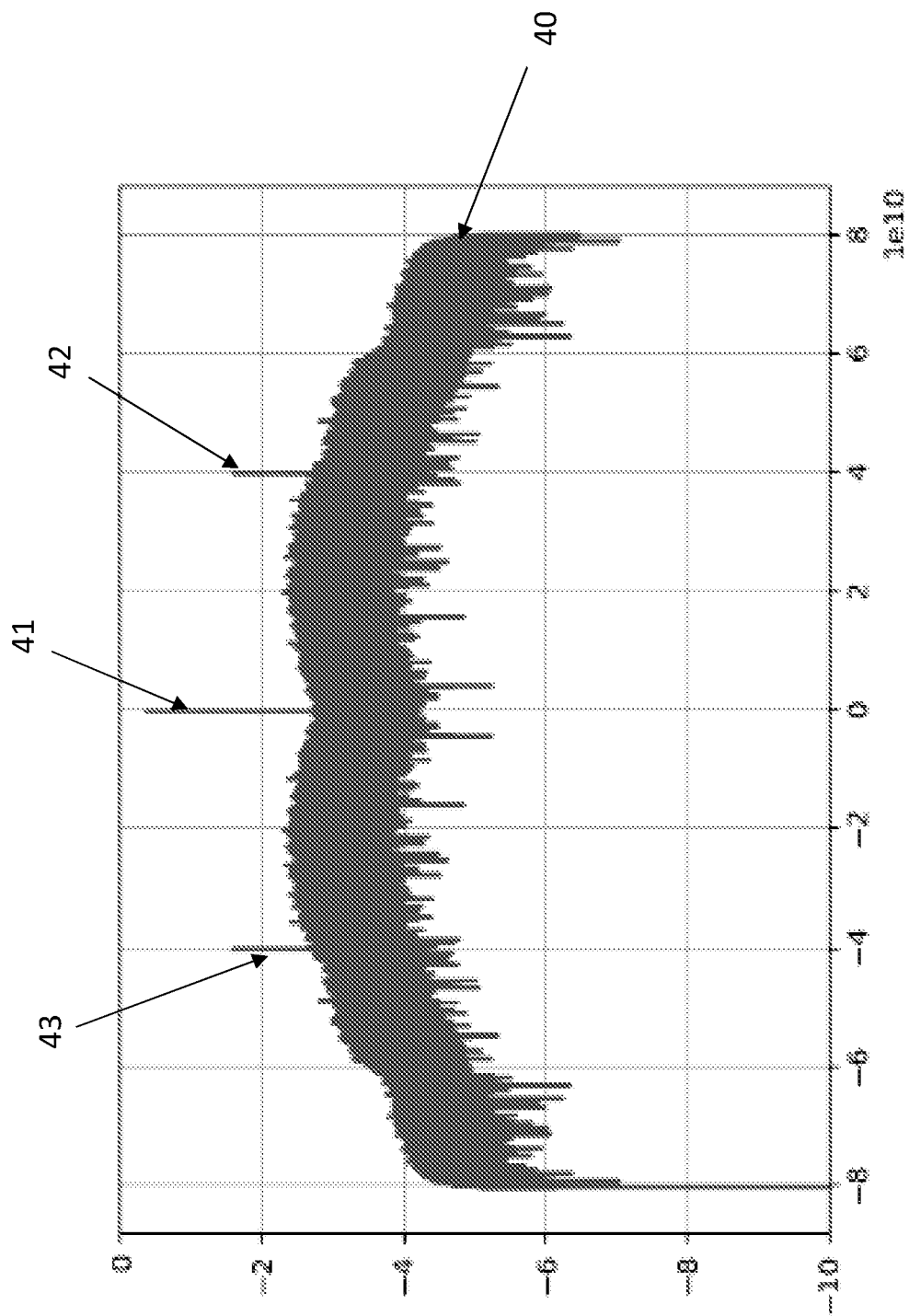
FIG. 4 illustrates how actual values of characteristics of the phase-modulated optical signal can be extracted from the electrical spectrum according to an embodiment of the invention.

FIG. 4 illustrates how actual values of characteristics of the phase-modulated optical signal can be extracted from the electrical spectrum according to an embodiment of the invention.

In particular, FIG. 4 is a diagram representing the power spectral density 40 in arbitrary units as a function of the frequency.

Further, the characteristics of the phase-modulated optical signal include a symbol rate, a roll-off factor and a modulation format.

Therein, according to the embodiment of FIG. 4, the symbol rate can be obtained by looking at the peaks 41, 42, 43 of the power spectral density 40. In particular, although the highest peak 41 can be ignored as being a constant part of the non-linear device, the second 42 and third highest peak 43 define spectral lines at the symbol rate.

Further, as roll-offs and the modulation format have impact on the general spectral shape, respectively the spectral shape of the power spectral density 40, wherein for example roll-offs impact the general spectral shape, according to the embodiment of FIG. 4 a machine learning technique is used to extract the roll-off factor of the phase-modulated optical signal and/or the modulation format of the phase-modulated optical signal from the electrical spectrum. Therein, a corresponding machine learning model, for example an image classifier, can be trained based on image data generally showing the relationship between the roll-off factor and the power spectral density and image data generally showing the relationship between the modulation format and the power spectral density and/or labeled image data representing the power spectral density obtained during prior applications, respectively prior determinations of the roll-off factor and/or the modulation format or based on data correspondingly representing the power spectral density in the form of a vector or a matrix with complex numbers.

REFERENCE SIGNS 1 apparatus
2 apparatus
3 determining device
4 actuator
5 non-linear device
6 generating device
7 pre-processing device
8 third-party terminal
9 analog-to-digital converter
10 photodiode
11 variable optical attenuator
20 apparatus
21 apparatus
22 tunable mixer
30 method
31 step
32 step
33 step
34 step
35 step
40 power spectral density
41 highest peak
42 second highest peak
43 third highest peak

The invention claimed is:

1. A method for controlling performance of an optical channel in an optical network, wherein in the optical network pairs of nodes of the network are associated with distinct bands of optical channels used for communication between the pairs of nodes, wherein the method comprises the steps of:
   (a) determining actual values of one or more characteristics of a phase-modulated optical signal comprising: acquiring the phase-modulated optical signal by a non-linear device, generating an electrical spectrum based on the acquired phase-modulated optical signal, and extracting actual values of one or more characteristics of the phase-modulated optical signal from the electrical spectrum;
   (b) for each of the one or more characteristics, determining whether the actual value is within a predetermined range for the characteristic; and
   (c) taking an action if, for one or more of the one or more characteristics, the actual value is outside of the predetermined range for the characteristic, to control performance of the optical channel, wherein:
   the one or more characteristics of the phase-modulated optical signal include a symbol rate, a roll-off factor and a modulation format;
   the phase-modulated optical signal is inputted into an optical channel by a third-party terminal, wherein the optical channel is part of an optical fiber network of a communication service provider, wherein the third-party terminal is used by a third party that has paid to use the optical fiber network;
   the non-linear device is a photodiode; and
   the action is configured to ensure that the third party using the third-party terminal does not use more resources than what they paid for and to prevent degradation of quality of transmission of neighboring wavelength-division multiplexing channels due to linear and non-linear interference.

2. The method according to claim 1, wherein the step of generating the electrical spectrum further comprises the steps of:
   analog spectral slicing of the acquired phase-modulated optical signal to detect sub-bands of the acquired phase-modulated optical signal;
   digitally stitching the detected sub-bands to generate an optimized signal; and
   generating the electrical spectrum based on the optimized signal.

3. The method according to claim 1, wherein a machine learning technique is used to extract the roll-off factor of the phase-modulated optical signal and/or the modulation format of the phase-modulated optical signal from the electrical spectrum.

4. The method according to claim 1, wherein, for each of the one or more characteristics, a warning is issued if the actual value is slightly outside of the predetermined range for the characteristic, and an allocation of wavelength to channel is blocked if the actual value is greatly outside of the predetermined range for the characteristic.

5. The method according to claim 1, wherein the step of taking an action if, for one or more of the one or more characteristics, the actual value is outside of the predetermined range for the characteristic comprises dampening a channel bandwidth and/or attenuating a signal power.

6. An apparatus for controlling performance of an optical channel in an optical network, wherein in the optical network pairs of nodes of the network are associated with distinct bands of optical channels used for communication between the pairs of nodes, wherein the apparatus comprises:
   an apparatus for determining actual values of one or more characteristics of a phase-modulated optical signal comprising a non-linear device that is configured to acquire the phase-modulated optical signal, a generating device that is configured to generate an electrical spectrum based on the acquired phase-modulated optical signal, and a pre-processing device that is configured to extract actual values of one or more characteristics of the phase-modulated optical signal from the electrical spectrum, wherein the apparatus for determining actual values of one or more characteristics of a phase-modulated optical signal is configured to determine actual values of one or more characteristics of a phase-modulated optical signal inputted into an optical channel in the optical network;
   a determining device that is configured to determine, for each of the one or more characteristics, whether the actual value is within a predetermined range for the characteristic, and
   an actuator that is configured to take an action if, for one or more of the one or more characteristics, the actual value is outside of the predetermined range for the characteristic, to control performance of the optical channel wherein:
   the one or more characteristics of the phase-modulated optical signal include a symbol rate, a roll-off factor and a modulation format;
   the phase-modulated optical signal is inputted into an optical channel by a third-party terminal, wherein the optical channel is part of an optical fiber network of a communication service provider, wherein the third-party terminal is used by a third party that has paid to use the optical fiber network;

the non-linear device is a photodiode; and the action is configured to ensure that the third party using the third-party terminal does not use more resources than what they paid for and to prevent degradation of quality of transmission of neighboring wavelength-division multiplexing channels due to linear and non-linear interference.

7. The apparatus according to claim 6, wherein the apparatus further comprises at least one tunable mixer that is configured to perform slicing and stitching of the acquired phase-modulated optical signal to generate an optimized signal, wherein the generating device is configured to generate the electrical spectrum based on the optimized signal.

8. The apparatus according to claim 6, wherein the pre-processing device is configured to use a machine learning technique to extract the roll-off factor of the phase-modulated optical signal and/or the modulation format of the phase-modulated optical signal from the electrical spectrum.

* * * * *